US008473118B2

(12) United States Patent
Gottifredi et al.

(10) Patent No.: US 8,473,118 B2
(45) Date of Patent: Jun. 25, 2013

(54) NAVIGATION SYSTEM FOR EXPLORING AND/OR MONITORING UNKNOWN AND/OR DIFFICULT ENVIRONMENTS

(75) Inventors: Franco Gottifredi, Rome (IT); Enrico Varriale, Rome (IT)

(73) Assignee: Thales Alenia Space Italia S.p.A. Con Unico Socio, Rome (IT)

( * ) Notice: Subject to any disclaimer, the term of this patent is extended or adjusted under 35 U.S.C. 154(b) by 0 days.

(21) Appl. No.: 13/551,796

(22) Filed: Jul. 18, 2012

(65) Prior Publication Data

US 2013/0046420 A1 Feb. 21, 2013

(30) Foreign Application Priority Data

Jul. 18, 2011 (IT) .............................. TO2011A0645

(51) Int. Cl.
 G05D 1/00 (2006.01)
 G05D 3/00 (2006.01)
 G06F 7/00 (2006.01)
 G07F 17/00 (2006.01)
(52) U.S. Cl.
 USPC .............. 701/2; 701/32.5; 701/420; 701/451; 700/65
(58) Field of Classification Search
 USPC ............................. 700/65; 701/32.5, 420, 451
 See application file for complete search history.

(56) References Cited

U.S. PATENT DOCUMENTS

| 6,445,344 | B1 | 9/2002 | Wise et al. | |
|---|---|---|---|---|
| 8,352,111 | B2 * | 1/2013 | Mudalige | 701/24 |
| 8,352,112 | B2 * | 1/2013 | Mudalige | 701/24 |
| 2005/0228613 | A1 | 10/2005 | Fullerton et al. | |
| 2007/0115895 | A1 | 5/2007 | Ling et al. | |
| 2008/0309556 | A1 | 12/2008 | Hohl | |
| 2010/0256835 | A1 * | 10/2010 | Mudalige | 701/2 |
| 2010/0309807 | A1 | 12/2010 | Rautiainen | |
| 2012/0326923 | A1 * | 12/2012 | Oehler et al. | 342/357.29 |

FOREIGN PATENT DOCUMENTS

| GB | 2460406 | 12/2009 |
|---|---|---|
| WO | WO 03/044986 | 5/2003 |
| WO | WO 2007/031844 | 3/2007 |

OTHER PUBLICATIONS

Italian Search Report for Italian Patent Application No. IT TO20110645 dated Feb. 22, 2012.

* cited by examiner

*Primary Examiner* — Calvin Cheung
(74) *Attorney, Agent, or Firm* — McCarter & English, LLP (57) ABSTRACT

A navigation system for exploring and/or monitoring unknown and/or difficult environments is provided that includes a mission control module, an unmanned vehicle operable for carrying out the exploration and/or monitoring mission, a primary node coupled to the mission control module that includes an ultra-wideband radio interface, and a plurality of secondary nodes for deployment in the unknown and/or difficult environment, each secondary node including an ultra-wideband radio interface. The primary node and secondary nodes are configured to form a hierarchical communication and localization network in which the primary node is associated with a primary hierarchical level and each secondary node is associated with a respective secondary hierarchical level lower than the primary hierarchical level. On the basis of distance measurements and distance-related messages associated with the system, a local reference coordinate system indicative of the positions of the secondary nodes with respect to the primary node is established.

13 Claims, 5 Drawing Sheets

NAVIGATION SYSTEM FOR EXPLORING AND/OR MONITORING UNKNOWN AND/OR DIFFICULT ENVIRONMENTS

TECHNICAL FIELD OF INVENTION

The present invention relates to a navigation system for exploring and/or monitoring unknown and/or difficult (or inaccessible) environments, such as:
- celestial objects (or bodies), for example, planets, natural satellites, stars and asteroids;
- areas affected by disasters, for example areas affected by earthquakes and/or tsunamis and/or floodings and/or involved by volcanic eruptions and/or landslides; and
- underwater environments.

STATE OF THE ART

As is known, in order to explore and/or monitor unknown and/or difficult (or inaccessible) environments, for example in order to explore an extraterrestrial planet, or in order to explore and/or monitor an underwater area, or in order to monitor an area affected by a disaster, unmanned or remotely-controlled vehicles, for example robots, which are configured to move in said environments and to acquire data on the surrounding environment during movement, are currently used. For example, in the field of astronautics, unmanned ground vehicles called rovers are used.

In this context, the ability of an unmanned or remotely-controlled vehicle, hereinafter called, for the sake of description simplicity, robot or rover, to determine its position while it is moving, in particular the ability to estimate its position and to determine the accuracy, i.e. the reliability, of this estimate, is essential for various reasons.

Firstly, a robot/rover is often assigned objectives to be reached, which are expressed in terms of position. For example, a robot/rover can receive commands that tell it to reach a specific position, to explore a specific area, to return in proximity to a predefined landmark, etc.

Secondly, estimation of the position of a robot/rover and the accuracy, or reliability, of this estimation are linked to long-range navigation for the construction of global maps of the environment explored/monitored, for finding the trajectories or paths that the robot/rover must follow and for enabling mission supervision. In particular, the spatial consistency of the maps generated is essential for efficient and robust operation of the robot/rover and it is the very knowledge of the position of the robot/rover that guarantees this consistency.

Finally, correct execution of the geometric trajectories provided by a path planner is linked to accurate knowledge of the motion of the robot/rover.

Therefore, self-localization of the robot/rover is one of the fundamental problems to be faced in the field of autonomous navigation.

When planning an exploration/monitoring mission in unknown/difficult environments, Global Navigation Satellite Systems (GNSSs), such as the Galileo, GPS, GLONASS systems and the like, can advantageously be taken into account. In the use of these systems, it is however necessary also to take into account the possible service interruptions of these systems, the deterioration of performances in some environments and the fact that the accuracy required in robot/rover localization and navigation (in the order of one centimeter in certain areas with obstacles and constraints) requires very costly differential systems. Also in the field of astronautics, wherein, moreover, performances are less stringent, it is possible to imagine the use of a constellation of artificial satellites of GNSS type that enable localization of a rover.

Currently, different methods for self-localization of a robot or of a rover are used in exploration/monitoring missions in unknown/difficult environments. In particular, in order to achieve autonomy in long-range navigation of a robot or rover, the following can be used:
- motion estimation methods;
- position refinement methods; and
- absolute localization methods.

In detail, motion estimation methods can be used to measure acceleration, speed and displacements between two known positions integrating raw data (odometry, inertial navigation, visual motion estimation, etc.). In motion estimation methods, the error on the position estimation obtained increases over time, regardless of the type of movement.

Instead, position refinement methods enable the position of a robot or rover to be estimated (or an initial position estimation to be corrected) using environmental models. These models can describe environmental features useful for localization of the robot/rover, for example landmarks, and/or represent with continuity the geometry of the terrain, such as digital elevation models (DEMs).

Finally, absolute localization methods aim at localizing a robot or rover with respect to an initial global model of the environment that can, for example, be constructed on the basis of images acquired by satellites or of digital models of the terrain determined on the basis of said images.

The table below summarizes the behaviour of the error and the typical operating frequency of the three above-stated types of methods for self-localization of a robot/rover together with the techniques that fall within the three different types.

TABLE

| TYPE | ERROR BEHAVIOR | TYPICAL ERROR FREQUENCY | TECHNIQUES |
|---|---|---|---|
| Motion estimation methods | Unlimited increase in the estimation error | 10 Hz | Inertial navigation Odometry; Stereo vision motion estimation |
| Position refinement methods | The error increases when new areas are explored, while it decreases when crossing areas already visited | 1 Hz | Landmark localization; DEM-based localization; Panoramic view indexing |
| Absolute localization methods | Limited | 0.1 Hz | Model-based localization |

OBJECT AND SUMMARY OF THE INVENTION

The Applicant has conducted an in-depth study on the navigation systems currently used in exploration/monitoring missions in unknown/difficult environments and, at the end of this study, felt the need to develop an innovative navigation system for unknown and/or difficult environments that operates more reliably and is more robust than those currently known and that consequently can be advantageously used for the navigation of a robot/rover in these environments, for exploring these environments and for monitoring these environments.

Therefore, the object of the present invention is that of providing a navigation system of the above-stated type.

The above-stated object is achieved by the present invention as it relates to a navigation system for exploration and/or monitoring missions in unknown and/or difficult environments, as defined in the appended claims.

In particular, the present invention concerns a navigation system for exploring and/or monitoring unknown and/or difficult environments, comprising:

- a mission control module designed to be placed in an unknown and/or difficult environment and to control a mission of exploration and/or monitoring of said unknown and/or difficult environment;
- an unmanned vehicle operable to carry out the mission of exploration and/or monitoring of said unknown and/or difficult environment;
- a primary node coupled to the mission control module and comprising a respective ultra-wideband radio interface; and
- a plurality of secondary nodes designed to be deployed in said unknown and/or difficult environment; each secondary node including a respective ultra-wideband radio interface.

In detail, the primary node and the secondary nodes are configured to form a hierarchical communication and localization network in which:

- the primary node is associated with a primary hierarchical level and each secondary node is associated with a respective secondary hierarchical level lower than the primary hierarchical level;
- each node is configured to send and receive messages through the hierarchical communication and localization network using the respective ultra-wideband radio interface;
- each secondary node is configured to
  - carry out, using the respective ultra-wideband radio interface, distance measurements with respect to, and together with, other secondary nodes associated with the same secondary hierarchical level with which said secondary node is associated, and with respect to, and together with, other nodes associated with hierarchical levels adjacent to the secondary hierarchical level with which said secondary node is associated, and
  - send to the primary node distance-related messages concerning the distance measurements carried out by said secondary node and integrity-related messages indicating a respective state of operational integrity of said secondary node; and
- the primary node is configured to
  - carry out, using the respective ultra-wideband radio interface, distance measurements with respect to, and together with, secondary nodes associated with a secondary hierarchical level immediately lower than the primary hierarchical level,
  - compute, on the basis of the distance measurements carried out by said primary node and the distance-related messages received from the secondary nodes, local reference coordinate system indicative of the positions of the secondary nodes with respect to the primary node, and
  - determine an overall integrity state of the hierarchical communication and localization network on the basis of the integrity-related messages received from the secondary nodes, the distance measurements carried out by said primary node and the distance-related messages received from the secondary nodes, said overall integrity state of the hierarchical communication and localization network being indicative of the states of operational integrity of the secondary nodes and of levels of reliability and accuracy of the positions of the secondary nodes in the local reference coordinate system.

Moreover, the unmanned vehicle comprises a vehicle control unit that includes a respective predefined radiocommunication interface and a respective ultra-wideband radio interface and that is configured to receive data from the mission control module using the respective predefined radiocommunication interface.

The mission control module comprises a respective predefined radiocommunication interface and is configured to send mission data concerning the exploration and/or monitoring mission and navigation data concerning the local reference coordinate system and the overall integrity state of the hierarchical communication and localization network to the vehicle control unit using the respective predefined radiocommunication interface.

Finally, the vehicle control unit is further configured to:
- carry out, using the respective ultra-wideband radio interface, distance measurements with respect to, and together with, one or more nodes of the hierarchical communication and localization network;
- compute a position of the unmanned vehicle in the local reference coordinate system on the basis of the navigation data received from the mission control module and of the distance measurements carried out by said vehicle control unit; and
- pilot the unmanned vehicle in said unknown and/or difficult environment on the basis of the mission data and of the navigation data received from the mission control module, the distance measurements carried out by said vehicle control unit and the position of the unmanned vehicle in the local reference coordinate system.

BRIEF DESCRIPTION OF DRAWINGS

For a better understanding of the present invention, some preferred embodiments, provided by way of explanatory and non-limiting example, shall now be illustrated with reference to the accompanying drawings (not to scale), wherein.

DETAILED DESCRIPTION OF PREFERRED EMBODIMENTS OF THE INVENTION

The following description is provided to enable an expert in the field to embody and use the invention. Various modifications to the embodiments presented will be immediately evident to experts and the generic principles disclosed herein could also be applied to other embodiments and applications, without however departing from the scope of protection of, the present invention.

Therefore, the present invention should not be considered as limited solely to the embodiments described and illustrated, but be granted the widest scope of protection consistent with the principles and characteristics presented herein and defined in the appended claims.

In particular, hereinafter, for the sake of description simplicity, there will be describe a preferred embodiment of the present invention that concerns the navigation of a rover, i.e. an unmanned ground vehicle, on an extraterrestrial planet, but, as stated above, the present invention must not be considered as limited solely to this preferred embodiment. In fact, the present invention can advantageously be used for:

the navigation of any type of vehicle, unmanned or remotely-controlled, which is configured to move on surfaces and/or underwater; and the localization and/or navigation in and/or exploration and/or monitoring of, any unknown and/or difficult (or inaccessible) environment, such as
   a celestial object (or body), such as a planet, a natural satellite, or an asteroid,
   an area affected by a disaster, for example an area affected by an earthquake and/or a tsunami and/or flooding and/or involved by a volcanic eruption and/or a landslide,
   an underwater environment, etc.

As stated above, a preferred embodiment of the present invention concerns a navigation system for a rover operating on an extraterrestrial planet.

In particular, said navigation system comprises:

a lander which, as is known, is a space module, or a spacecraft, which descends and lands on the surface of a celestial body, i.e., in the case in hand, on the surface of an extraterrestrial planet, and which, according to the preferred embodiment of the present invention, is equipped with a first short-range radio interface based on ultra-wideband (UWB) technology and with a second long-range radio interface that can also be based on ultra-wideband (UWB) technology or can be based on a different radiocommunication technology;

at least one rover, i.e. an unmanned ground vehicle, which is configured to move on the surface of the extraterrestrial planet and is equipped with a first short-range radio interface based on UWB technology and with a second long-range radio interface based on the same radiocommunication technology as the second long-range radio interface of the lander (UWB or other radiocommunication technology); and a plurality of wireless communication devices which hereinafter shall be called, for the sake of description simplicity, wireless devices, which are each equipped with a respective short-range radio interface based on UWB technology, and which are intended, in use, to be deployed in an area of the surface of the extraterrestrial planet that represents the operating area of the navigation system, i.e. the area in which the navigation system provides the rover with the localization and navigation service.

In the text below, for the sake of description simplicity, reference will be made to a single rover, it be understood that the description regarding the navigation of a single rover can be extended to the navigation of a plurality of rovers and, more in general, to the navigation of a plurality of unmanned or remotely-controlled vehicles which are configured to move on surfaces and/or underwater.

Moreover, hereinafter the operation of the navigation system according to the preferred embodiment of the present invention will be described in detail presenting the various functionalities of each component of said system. In particular, hereinafter the various functionalities of each component of the navigation system will often be described, for the sake of description simplicity, as implemented by the component as a whole, for example hereinafter the functionalities implemented by the lander as a whole and the functionalities implemented by the rover as a whole will often be described. In this regard, it is important to underscore that, in order to define and provide an understanding of the present invention, it is essential to describe the functionalities implemented by each component and that, after these functionalities have been described, the type of hardware and software architecture that allows this component to implement the respective functionality will be clear to the expert in the field. For example, at the end of the following description it will be clear to the expert in the field that, in order to implement the respective functionalities, the lander can advantageously comprise:

a communication apparatus that includes the respective first short-range radio interface based on UWB technology and the respective second long-range radio interface, and that is configured to use these interfaces to communicate with, send commands to, and exchange data with the rover(s) and the wireless devices as will be described hereinafter;

a data processing unit configured to carry out processing and the calculations that will be described hereinafter in relation to the lander;

a mission control unit configured to monitor and control the mission of the rover(s) on the basis of the information provided by the rover(s) and of the information obtained through the navigation system as will be described hereinafter;

etc.

In the same way, at the end of the following description, it will be clear to the expert in the field that each rover, in order to implement the respective functionalities, can advantageously comprise:

a respective communication apparatus that includes the respective first short-range radio interface based on UWB technology and the respective second long-range radio interface, and that is configured to use these interfaces to communicate and exchange data with the lander and the wireless devices as will be described hereinafter;

a respective data processing unit to carry out processing and calculations as will be described hereinafter;

a respective vehicle control unit configured to pilot the rover on the basis of the information obtained through the navigation system as will be described hereinafter;

etc.

Returning now to the description of the navigation system according to the preferred embodiment of the present invention, the lander and the wireless devices are configured to form a hierarchical communication and localization network that operates as localization system for the rover. In this hierarchical communication and localization network the lander calculates, as will be explained in detail hereinafter, a local reference system on the basis of the distance, or ranging, measurements that each wireless device calculates with respect to the wireless devices with which said wireless device is able to establish a wireless communication through the short-range radio interface based on UWB technology (cooperative positioning). The rover is considered as a "dynamic node" of the hierarchical communication and localization network and can recover its position in the local reference system both by calculating its position autonomously and by receiving information and data from the data processing unit of the lander.

More in detail, the lander operates as primary node of the hierarchical communication and localization network and represents the origin of the local reference system. The rover communicates, through the short-range radio interface based on UWB technology, with the wireless devices in order to determine its position in the local reference system. In particular, the position of the rover is determined in the local reference system and, if the lander is referenced on a global reference system, for example a planetary reference system, then the position of the rover can also be calculated in the global reference system. This capacity lead to the possibility of referencing the position of the rover with respect to a planetary reference system and, therefore, to the possibility of referencing, with respect to a planetary reference system, also the information and data, in terms of position, collected by any sensors with which the lander, the rover and the wireless devices may advantageously be equipped.

The communication protocol used by the wireless devices makes it possible to:
- calculate the local reference system required for navigation of the rover in the operating area of the navigation system;
- provide the rover with the information useful for calculating its position in the operating area of the navigation system;
- optimize access to the radio channel based on UWB technology and use of the radio resources of the wireless devices;
- implement mechanisms that allow the hierarchical communication and localization network to function as a back-up communication network for the transfer of data and/or information between the rover and the lander;
- monitor the state of the single wireless devices;
- provide the data necessary to calculate the integrity of the navigation system; and
- implement the logical barrier functionalities to delimit the operating area of the navigation system and to provide proximity alarms to the rover in order to prevent collisions.

Moreover, the communication protocol used by the wireless devices enables each wireless device to communicate with the lander through a routing mechanism that uses intermediate Wireless devices ("multi-hop" routing mechanism) in the case in which the lander is out of the direct communication range of the short-range radio interface based on UWB technology of said wireless device.

The navigation system implements a centralized calculation concept in order to minimize the energy consumption of the wireless devices. In fact, the data processing unit of the lander carries out calculations that are more onerous in terms of calculation power required, such as:
- calculation of the geometry of the local reference system based on the information sent by the single wireless devices;
- calculation of the routing paths; and
- determination of the state of integrity of the navigation system.

Moreover, the data processing unit of the lander can advantageously also provide an auxiliary/supplementary calculation of the position of the rover on the basis of the signals that the rover receives from the wireless devices, for example in the case in which the rover requires to save energy or in the case in which the computational resources of the rover must be diverted to other tasks.

The navigation system uses two different radio communication channels:
- a first radio channel based on UWB technology that is used for the distance measurements carried out by the wireless devices and for communications between wireless devices, for the distance measurements carried out cooperatively by the wireless devices and by the lander, for communications between the wireless devices and the lander, and for communications between the wireless devices and the rover; the first radio channel can advantageously also be used as redundant channel for transferring data between the rover and the lander; each wireless device accesses the first radio channel using the respective short-range radio interface based on UWB technology; the lander and the rover access the first radio channel each using the respective first short-range radio interface based on UWB technology; and
- a second radio channel that is used for communications between the lander and the rover; the lander and rover access the second radio channel each using the respective second long-range radio interface; the characteristics of the second radio channel (band, modulation, coding, power, etc.) depend on the type of mission and enable the lander to communicate with rover in the whole of the area covered by the first radio channel plus a safety margin that depends on the mission parameters (for example, the speed of the rover, the delay with which commands are processed, etc.); as UWB technology can also be used for long-range communications, the second long-range radio interfaces of the lander and of the rover, as described previously, can also be based on UWB technology and, therefore, the second radio channel can also be based on UWB technology; in the case in which the second long-range radio interfaces of the lander and of the rover are also based on UWB technology, these interfaces would not be suitable to take precise distance measurements and consequently would not be used for this purpose; therefore, in order to implement the present invention, it is possible to use, for reasons of design and/or energy consumption efficiency/simplicity, a double UWB radio communication infrastructure: a first short-range UWB radio communication infrastructure for distance measurements and short-range communications, and a second UWB radio communication infrastructure for long-range communications and without the need for routing; moreover, in the case in which the second long-range radio interfaces of the lander and of the rover are also based on UWB technology, different modulations and/or different transmission powers could advantageously be used on two radio channels in order to minimize mutual interference; in any case, again as described previously, the second long-range radio interfaces of the lander and of the rover (and, therefore, the second radio channel) can be based on a different radiocommunication technology; for example, the second long-range radio interfaces of the lander and of the rover could advantageously be those normally used in exploration missions for data exchange between lander and rover.

Figure 1:
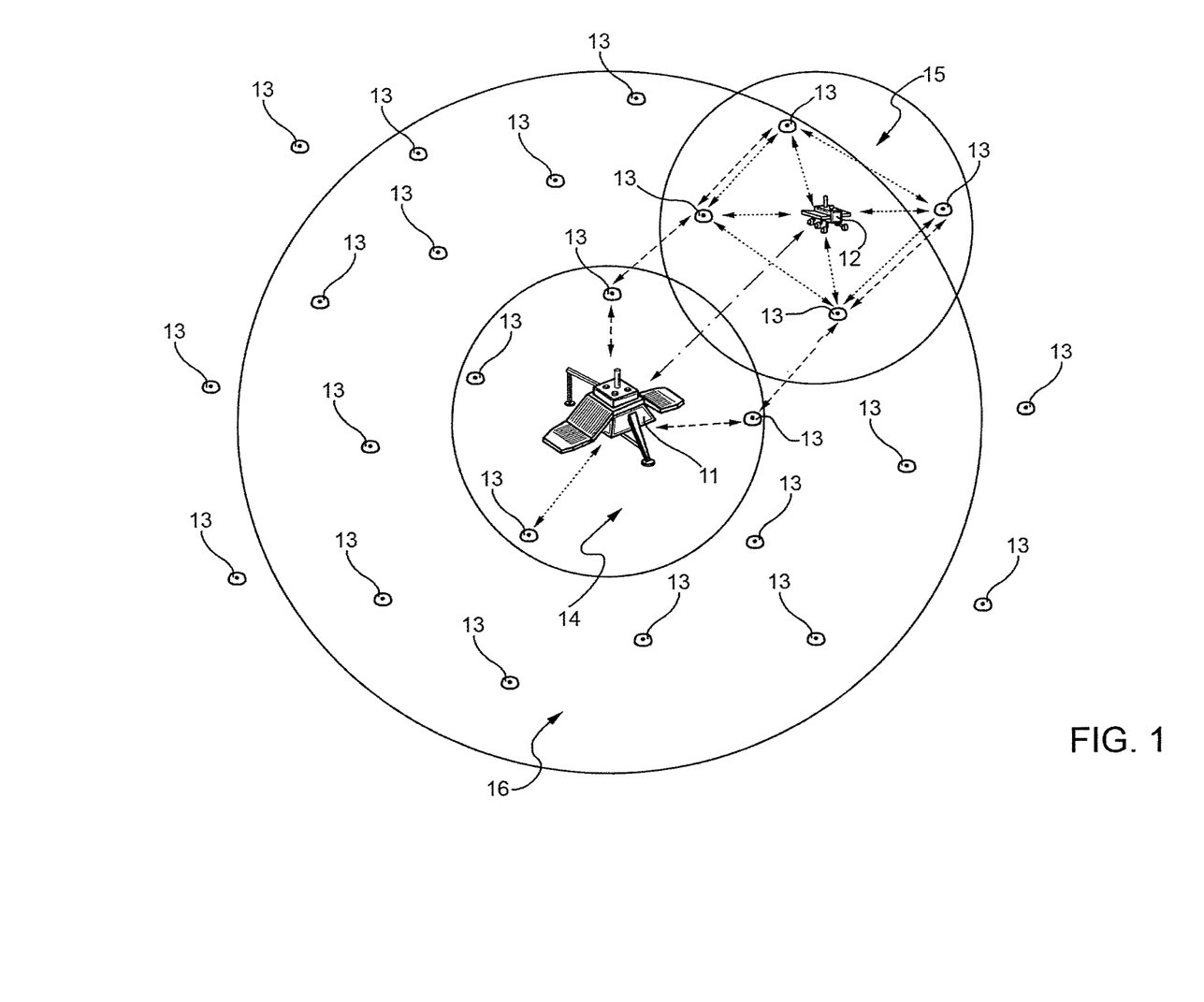
FIG. 1 schematically shows examples of radio communications performed in a navigation system according to a preferred embodiment of the present invention.

FIG. 1 schematically shows examples of radiocommunications based on the two above-stated radio channels.

In particular, FIG. 1 shows:
the lander (indicated with 11);
the rover (indicated with 12);

the wireless devices (indicated with 13) deployed on the surface of the extraterrestrial planet;
a first radio coverage area (represented by a first circle indicated as a whole with 14), which represents the area covered by the first radio channel for the communications based on UWB technology of the lander 11;
a second radio coverage area (represented by a second circle indicated as a whole with 15), which represents the area covered by the first radio channel for the communications based on UWB technology of the rover 12;
a third radio coverage area (represented by a third circle indicated as a whole with 16), which represents the area covered by the second radio channel for the long-range communications between the lander 11 and the rover 12;
a first two-way radiocommunication (represented by a first two-way dotted arrow) based on UWB technology, i.e. carried out on the first radio channel, between the lander 11 and a first wireless device 13 that falls within the first coverage area 14;
second two-way radiocommunications (represented by second two-way dotted arrows) based on UWB technology, i.e. carried out on the first radio channel, between second wireless devices 13 that fall within the second coverage area 15 and between the rover 12 and said second wireless devices 13;
a third two-way radiocommunication (represented by a two-way dot-dash arrow) carried out on the second radio channel between the lander 11 and the rover 12; and
fourth two-way radiocommunications (represented by two-way dashed arrows) between the lander 11 and the second wireless devices 13 which fall within the second coverage area 15; said fourth two-way radio communications are based on UWB technology, i.e. are carried out on the first radio channel, and are implemented through the multi-hop routing mechanism (which was introduced previously and which will be described in detail hereinafter) of the hierarchical communication and localization network.

In FIG. 1 it can be noted that some wireless devices 13 may also be outside the third radio coverage area 16, i.e. beyond the coverage limit provided by the second radio channel. This condition does not represent an anomaly as the navigation system is capable of using these wireless devices 13 both for normal operations (those that take place in the coverage range of the second radio channel), and as a security system for emergency conditions in the case in which the rover 12 is located outside the range of the second radio channel (for example, due to errors in the processing of commands or due to a decrease in the transmission power of the lander 11 and/or of the rover 12).

Preferably, the wireless devices are deployed on the surface of the extraterrestrial planet during the descent of the lander on the extraterrestrial planet. In this regard, FIG. 2 shows, schematically and purely by way of example, entry of the lander into the atmosphere of the extraterrestrial planet, and descent and landing of the lander on the extraterrestrial planet.

Figure 2:
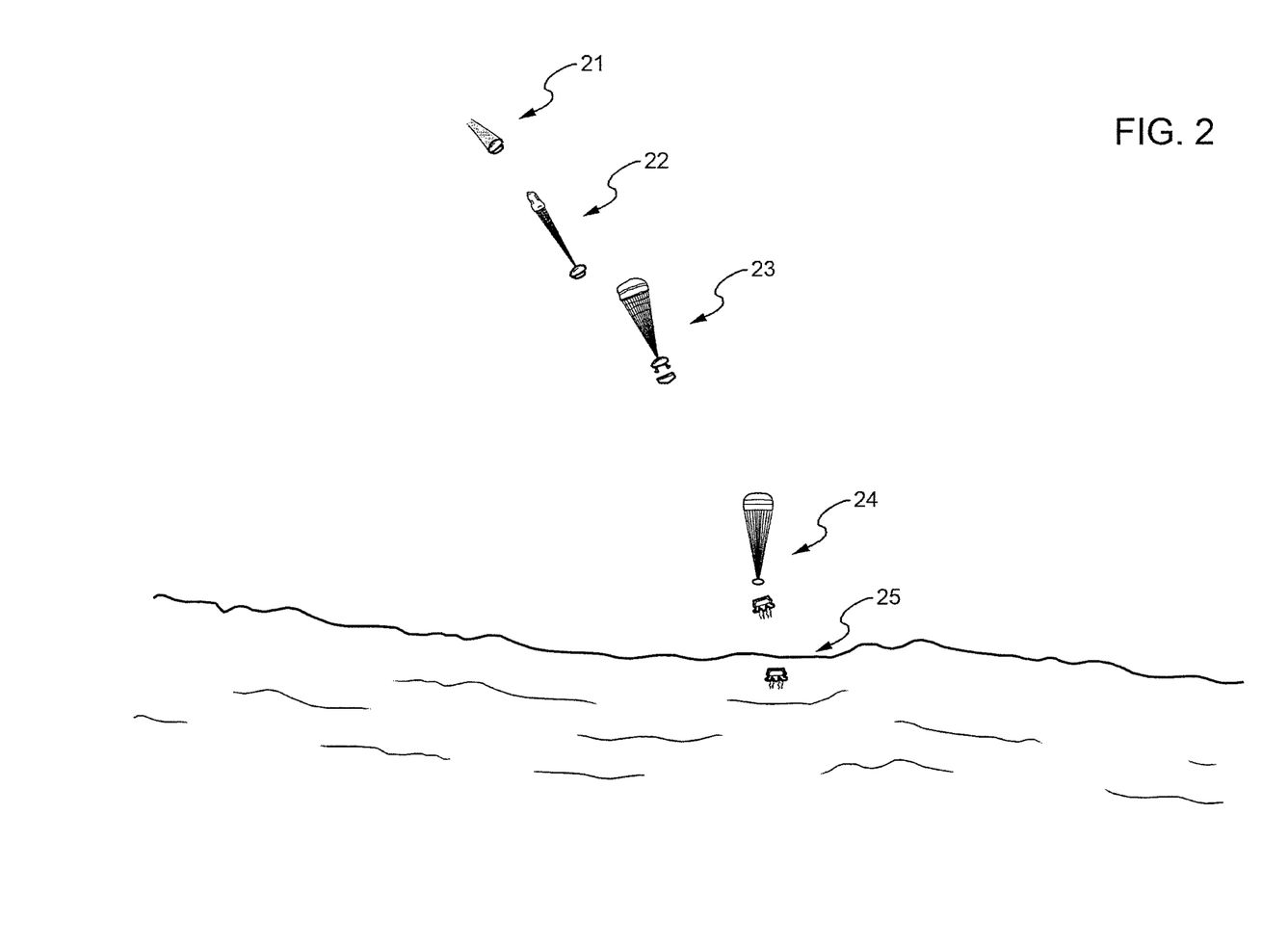
FIG. 2 schematically shows the entry of a space vehicle into the atmosphere of an extraterrestrial planet, and the descent and landing of the space vehicle on the extraterrestrial planet.

In particular, FIG. 2 shows:
a first step (indicated with 21) wherein a space module that comprises the lander enters the atmosphere of the extraterrestrial planet; in this first step 21 there are 5 minutes to touchdown and the space module is at a height of 125 Km from the surface of the extraterrestrial planet and has a speed of 6,900 m/s;
a second step (indicated with 22) wherein the space module deploys a parachute; in this second step 22 there are 2 minutes to touchdown and the space module is at a height of 8,800 m from the surface of the extraterrestrial planet and has a speed of 490 m/s;
a third step (indicated with 23) wherein the space module releases a heat shield; in this third step 23 there are 110 seconds to touchdown and the space module is at a height of 7,500 m from the surface of the extraterrestrial planet and has a speed of 250 m/s;
a fourth step (indicated con 24) wherein the lander is released from the space module; in this fourth step 24 there are 35 seconds to touchdown and the lander is at a height of 1,300 m from the surface of the extraterrestrial planet and has a speed of 80 m/s; and
a fifth step (indicated with 25) wherein the lander lands on the surface of the extraterrestrial planet with a speed of 2.5 m/s.

As previously described, the wireless devices are preferably released during the descent of the lander on the extraterrestrial planet at different heights in such a manner as to cover a ground area of the dimension necessary for the exploration mission of the rover. The ground area covered by the wireless devices is the operating area, or service area, wherein the navigation system provides its capacities to determine the position of the rover. Moreover, the network of the wireless devices can advantageously be expanded through further wireless devices released by the rover during its movement on the surface of the extraterrestrial planet in order to extend and improve the coverage, performances and integrity of the localization and navigation service. Therefore, to summarize, deployment of the wireless devices, which determines the service area and the performances of the navigation system, can be implemented:
during the steps of Entry, Descent and Landing (EDL) of the lander; and/or
by the rover during its mission of exploration of the extraterrestrial planet.

Figure 3:
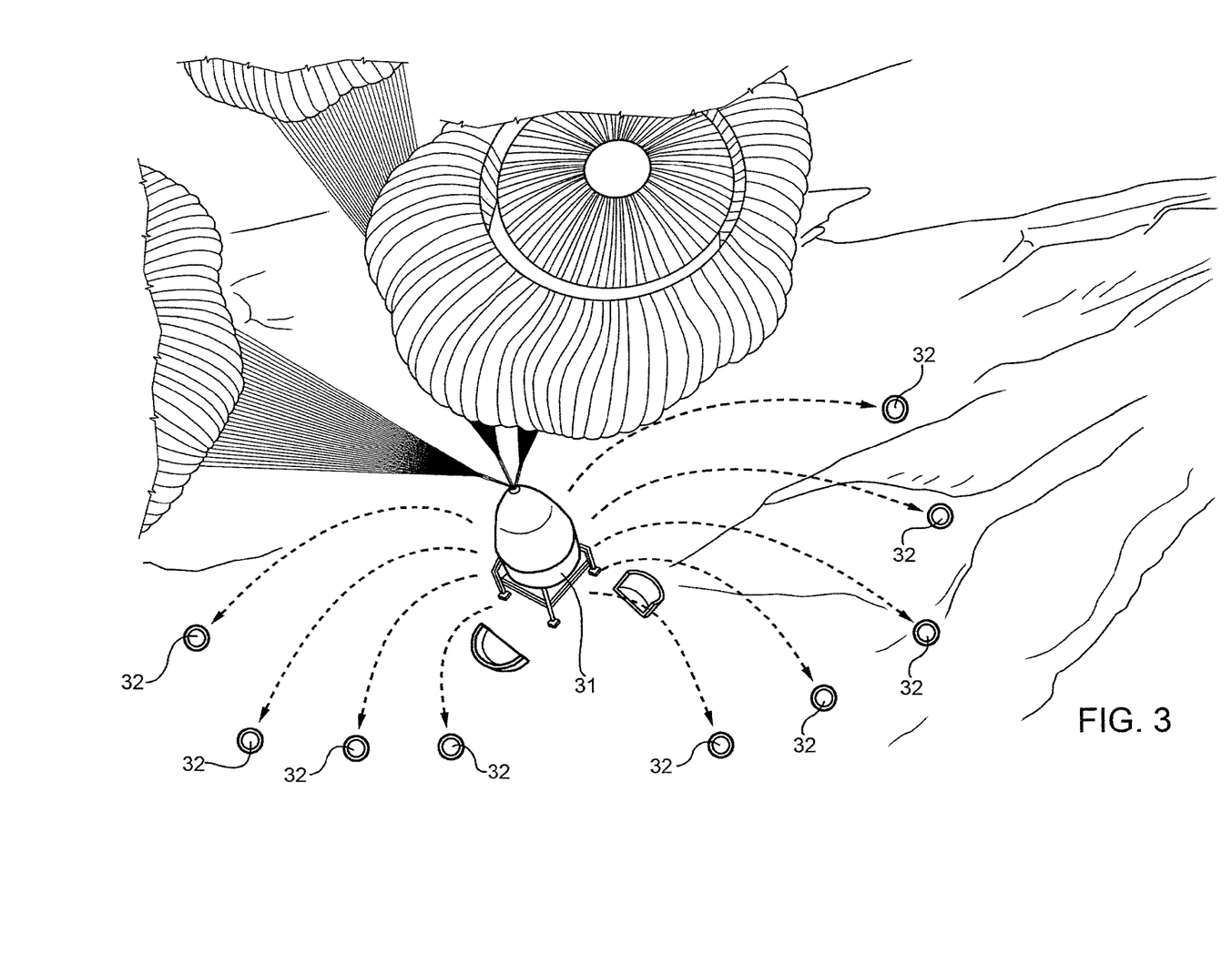
FIG. 3 schematically shows the release of wireless communication devices during the descent of a space vehicle on an extraterrestrial planet according to a preferred embodiment of the present invention.

In this regard, FIG. 3 shows, schematically and purely by way of example, the release of wireless devices during the descent of the lander on the extraterrestrial planet, in particular in a step of descent comprised between the second step 22 and the fourth step 24 shown in FIG. 2.

In detail, FIG. 3 shows:
the space module (indicated with 31) which comprises the lander and which is descending onto the surface of the extraterrestrial planet; and
a plurality of wireless devices (indicated with 32) released by the space module 31 during descent.

As previously described, deployment of the wireless devices during the EDL steps determines the service area of the navigation system. Therefore, in carrying out this deployment it is important to take into account the geometric distribution of the wireless devices and their mutual distance on the surface of the extraterrestrial planet.

In particular, the expected distance of the wireless devices from the vertical of the position of the lander during the EDL steps can advantageously be preliminarily determined during the mission planning step in order to define the service area of the navigation system and the density of the wireless devices.

For example, in order to obtain, using 70 wireless devices, a service area of approximately 1.5 km in diameter with an average distance between wireless devices of approximately 200 m, said wireless devices could advantageously be released during the EDL steps of the lander as follows:
30 wireless devices released at a height of 6,000 m from the surface of the extraterrestrial planet;
20 wireless devices released at a height of 3,000 m from the surface of the extraterrestrial planet;

15 wireless devices released at a height of 2,000 m from the surface of the extraterrestrial planet; and 5 wireless devices released at a height of 1,000 m from the surface of the extraterrestrial planet.

Naturally the numbers provided above represent a rough estimate as they do not take into account atmospheric disturbances, such as winds and friction, and the conformation of the terrain (for example slopes, rocks, craters, etc.) which can deviate/disturb the landing of the wireless devices (for example causing bouncing, slipping, etc.). All these disturbances can advantageously be taken into account in the mission analysis and definition step for dimensioning of the navigation system.

Moreover, as previously described, when the rover is operating and is about to reach the edge of the service area, it can advantageously release further wireless devices in order to extend the service area of the navigation system.

After the wireless devices have been deployed on the surface of the extraterrestrial planet during the EDL steps of the lander and after the lander has landed and has terminated all the preliminary operations (for example after it has deployed the solar panels used to produce energy), the lander starts, autonomously or in response to one or more commands received remotely (for example from a control station on Earth or from a space station orbiting around the extraterrestrial planet), a initialization step aimed at defining the hierarchical communication and localization network formed by the lander and by the wireless devices.

At the start of this initialization step all the wireless devices, previously positioned on the ground in the operating area, are in standby mode, i.e. waiting passively for an activation message transmitted by the lander.

The generation and transmission of control messages in the hierarchical communication and localization network is based on a hierarchical system structured in several levels identified by a natural number comprised between 0 and MAX_LEVEL wherein the smaller the number, the greater the authority of the messages transmitted. In this hierarchy, the lander represents the level-0 node, while all the wireless devices, before initialization, are advantageously pre-configured to a level equal to MAX_LEVEL.

In the first phase of the initialization step the lander, i.e. the level-0 node of the hierarchical communication and localization network, carries out a search of the wireless devices adjacent thereto on the first radio channel, i.e. on the radio channel based on UWB technology. According to the present invention and, therefore, in the following description, adjacency is defined in terms of "radio visibility". In particular, according to the present invention and in the following description, two nodes of the hierarchical communication and localization network are said to be adjacent if and only if a wireless communication based on the use of short-range UWB technology, i.e. based on the use of the first radio channel, can be established between them.

The search for radio devices adjacent to the lander consists in the lander sending in broadcast an activation message (i.e. addressed to all). The wireless devices that are able to receive the activation message reply to the lander and start to carry out distance (i.e. ranging) measurements from the lander. These wireless devices help to determine level 1 of the hierarchical communication and localization network. In particular, the ranging measurements continue for a preset time, at the end of which the wireless devices whose distances comply with predetermined parameters of statistical stability of the ranging measurements are determined; these wireless devices become the level-1 nodes of the hierarchical communication and localization network.

Figure 4:
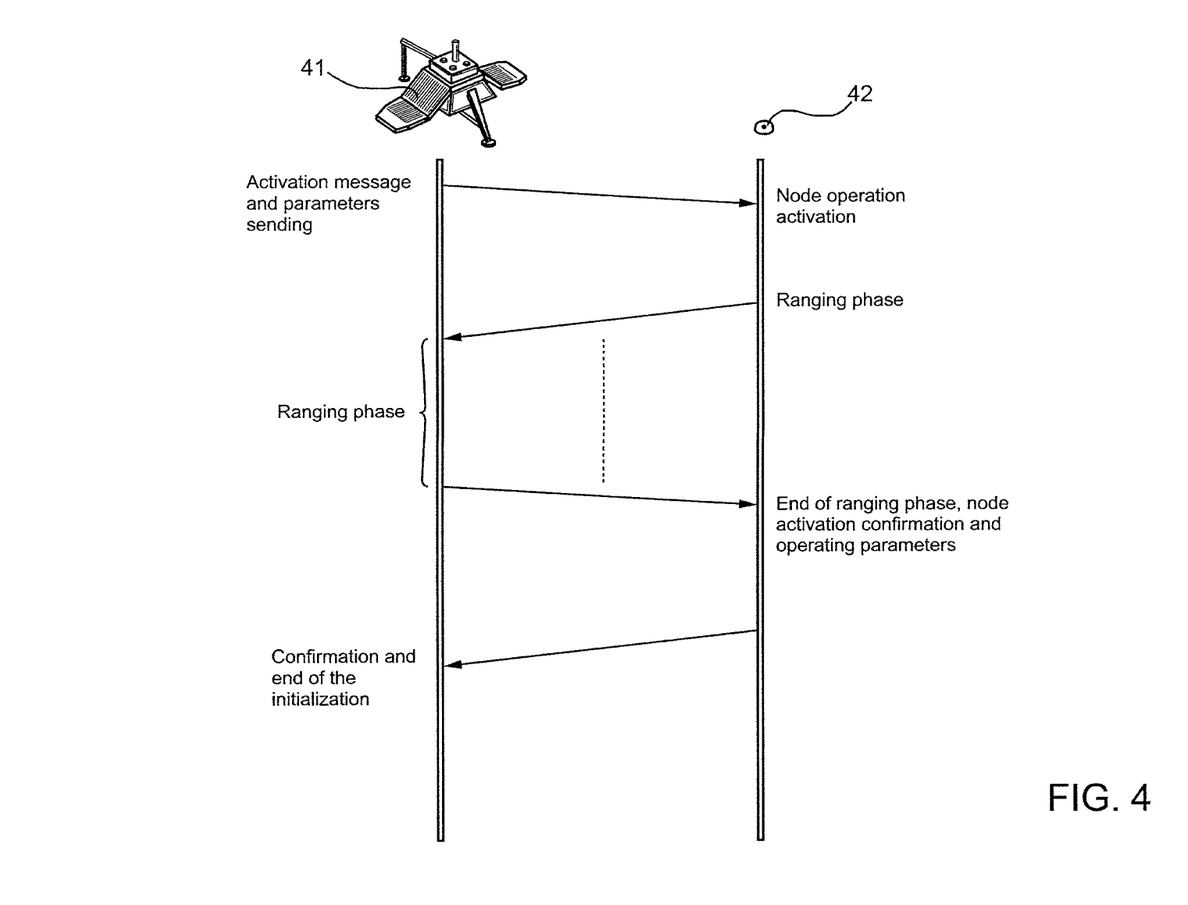
FIG. 4 schematically shows an example of communication protocol usable according to a preferred embodiment of the present invention to activate and configure a wireless communication device.

In this regard, FIG. 4 schematically shows an example of communication protocol that can be used according to a preferred embodiment of the present invention to activate and configure as level-1 node a wireless device adjacent to the lander.

In particular, FIG. 4 shows a temporal diagram of the messages exchanged on the first radio channel between the lander (indicated with 41) and a wireless device (indicated with 42) adjacent thereto.

In detail, FIG. 4 schematically shows:

the broadcast transmission on the first radio channel by the lander 41 of an activation message that causes activation of the wireless devices by which it is received and which is received by the wireless device 42 which, therefore, is activated (this activation message advantageously comprises some parameters, such as a temporal reference ("timestamp") for synchronization between the lander 41 and the wireless device 42, the MAC (Media Access Control) address of the lander 41, and the identification number of the level of the lander 41, i.e. the identification number of level 0);

sending on the first radio channel from the wireless device 42 to the lander 41 of a response message (this response message advantageously comprises the MAC address of the wireless device 42 and the request for ranging measurements);

a ranging session wherein the lander 41 and the wireless device 42 mutually transmit radio frequency signals on the first radio channel, carry out ranging, i.e. distance measurements, on the basis of the power of the signals respectively received, exchange on the first radio channel information relating to these distance measurements and store the results of the various measurements taken; after elapse of a preset time from the start of the ranging session, the lander 41 determines the level-1 nodes on the basis of the distance measurements taken;

sending on the first radio channel from lander 41 to the wireless device 42 of an end-of-ranging-session message that comprises the identification number of the level assigned to the wireless device 42, i.e. the identification number of level 1; and sending on the first radio channel from the wireless device 42 to the lander 41 of a confirmation message (this confirmation message advantageously comprises information on the state of the wireless device, such as the charge level of the battery of the wireless device 42).

At the end of the initialization step of the level-1 nodes, the wireless devices identified as level-1 nodes carry out ranging measurements with all the other active wireless devices (which in this step comprise only the lander and the level-1 wireless devices). The measurements thus carried out are sent to the lander which uses them to determine the geometry, i.e. the topology, of the local reference system. In particular, in order to determine a two-dimensional reference system, at least two active level-1 wireless devices are necessary, while to determine a local three-dimensional reference system a larger minimum number of measurements are required.

Henceforth, for the sake of description simplicity, an example procedure that can be used to determine a local two-dimensional Cartesian reference system will be described, it being understood that this procedure can be applied, mutatis mutandis, also to determine a local three-dimensional Cartesian reference system.

The first step in determination of a local two-dimensional Cartesian reference system is the selection of a node (i.e. of a wireless device) that enables the axis of the abscissae, i.e. the x-axis, of the two-dimensional Cartesian reference system to be fixed. This x-axis is identified by the hypothetical segment that joins the lander and the wireless device selected. In this way, the position, in the two-dimensional Cartesian reference system, of the node selected to fix the x-axis is automatically determined. In fact, this node has the coordinates (d(L,k),0), where d(L,k) represents the distance from the lander L of the wireless device k selected to fix the x-axis. In this way the axis of the ordinates, i.e. the y-axis, of the two-dimensional Cartesian reference system is also automatically determined.

The selection criterion of the wireless device used to fix the x-axis of the local two-dimensional Cartesian reference system is based on the use of statistical information gathered during the initialization step of level 1 of the hierarchical communication and localization network. In particular, the node (i.e. the wireless device) that has, from a statistical viewpoint, the most stable and robust measurements is selected. For example, to select the node the following parameters can be considered: the difference between the minimum and the maximum distance measured, and statistics of the first and of the second order (mean and variance) on the ranging measurements taken between the element (i.e. the wireless device) considered, the lander and all the other adjacent wireless devices. Another parameter that can be considered is the number of wireless devices adjacent to the node considered. The object of this evaluation is to select a node that guarantees the greatest stability in the measurements (minimization of propagation of measurement errors) and that is in communication with the largest possible number of other nodes. This information implicitly provides indications on the stability on the ground of the node and the quality of the signal (multipath, line of sight (LOS), etc.).

Once the node for fixing the x-axis of the local two-dimensional Cartesian reference system has been selected and, therefore, once the y-axis of the local two-dimensional Cartesian reference system has also be automatically fixed, the lander uses the measurements taken in the initialization step of level 1 to calculate the coordinates of the remaining nodes.

In particular, the coordinates are calculated incrementally adding, one by one, the level-1 nodes to which coordinates have not yet been assigned in the local two-dimensional Cartesian reference system. In detail, the lander calculates the coordinates of the level-1 nodes on the basis of the coordinates of the level-1 nodes with coordinates that have already been determined and of the ranging measurements taken in the initialization step of level 1. In this context the lander is the node with coordinates (0,0), i.e. it represents the origin of the local two-dimensional Cartesian reference system.

Figure 5:
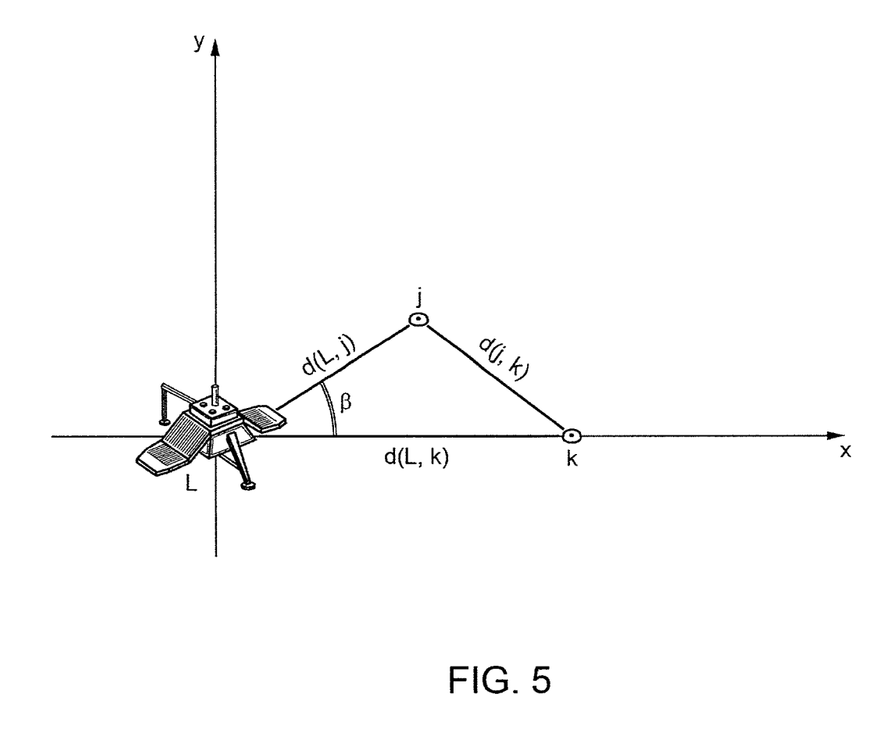
FIG. 5 schematically shows a calculation of coordinates of a wireless communication device according to a preferred embodiment of the present invention.

In this regard, FIG. 5 schematically shows calculation of the coordinates of a generic level-1 node (i.e. wireless device) j on the basis of the coordinates of the lander L and of the node k selected to fix the x-axis of the local reference system, of the distance of the node k from the lander L calculated in the initialization step of level 1, of the distance of the node j from the lander L calculated in the initialization step of level 1 and of the distance of the node k from the node j calculated in the initialization step of level 1.

In particular, FIG. 5 shows:
the lander L which is positioned in the point with coordinates (0,0), i.e. at the origin, of the local two-dimensional Cartesian reference system xy;
the node k which has been selected to fix the x-axis of the local two-dimensional Cartesian reference system xy, which is at a distance d(L,k) from the lander L and which, therefore, is positioned in the point with coordinates (d(L,k),0); and
the generic node j which is at a distance d(L,j) from the lander L and at a distance d(j,k) from the node k.

The coordinates $(j_x, j_y)$ of the node j can be expressed mathematically according to the following two trigonometric formulae:

$$j_x = d(L,j) \cdot \cos \beta$$

$$j_y = d(L,j) \cdot \sin \beta$$

where $\beta$ indicates the angle comprised between the x-axis and the segment that joins the lander L and the node j and which is along d(L,j).

Moreover, according to the law of cosines (or Carnot's theorem):

$$\beta = \arccos\left(\frac{d(L,j)^2 + d(L,k)^2 - d(j,k)^2}{2 \cdot d(L,k)}\right).$$

Therefore, as the distances d(L,k), d(L,j) and d(j,k) were calculated in the initialization step of level 1 and, therefore, are known, it is possible to determine $\beta$ and, therefore, the coordinates $(j_x, j_y)$ of the node j.

The calculation procedure of the coordinates described above is, therefore, repeated by the lander for each level-1 wireless device to which the coordinates have not yet been assigned in the local two-dimensional Cartesian reference system.

The procedure to define the local reference system described above for the two-dimensional case can, as previously said, also be used to define a local three-dimensional reference system. In particular, at least three active level-1 wireless devices are necessary in order to determine a local three-dimensional reference system. Moreover, the precision and reliability of calculation of the third dimension, i.e. of the vertical coordinates, can be improved using a data fusion technique based on data supplied by sensors coupled to the wireless devices (and if necessary also to the lander), such as (in the case in which the extraterrestrial planet has an atmosphere and the atmospheric behaviour of said extraterrestrial planet is known) barometric altimeters, and/or through digital models of the terrain of the extraterrestrial planet obtained through radar acquisitions, satellite ranging systems, etc. In any case, it is important to underscore that it is not necessary to know the third coordinate for operation of the navigation system according to the present invention, which, therefore, can advantageously also work with only two dimensions.

Once the level-1 wireless devices have been started up and the lander has defined the local reference system and calculated the coordinates of all the level-1 wireless devices, the same procedure is repeated for the subsequent levels, i.e. for the nodes that could not be reached by the lander during the first step.

In particular, the level-1 nodes start the same procedure started by the lander, i.e. they transmit in broadcast an activation message. The primary difference is that the information collected is sent by the level-1 nodes to the lander, where it is processed.

In detail, each level-1 node carries out ranging measurements with all the nodes adjacent thereto not yet activated (i.e. whose level identification number has not yet been assigned or is set to the maximum value MAX_LEVEL). The measurements taken are then transferred from the level-1 nodes to the lander which uses them to determine the nodes to be activated, which are, therefore, assigned the identification number of level 2.

Subsequently, in the same way as for level 1, a ranging measurement session is carried out by the newly activated nodes, to which all the currently activated nodes reply, i.e., in this step, the level-2 and level-1 nodes. These measurements are sent by each level-2 wireless device, using a routing mechanism that involves at least one respective level-node, to the lander that uses them to determine the coordinates of the newly activated wireless devices.

The same procedure is carried out for the higher levels until no new node is added to the hierarchical communication and localization network. At this point the hierarchical communication and localization network has been initialized.

As previously described, in the hierarchical communication and localization network each communication device (i.e. each node) to which a respective level l has been assigned (with $1 \leq l \leq MAX\_LEVEL$), can communicate directly on the first radio channel (i.e. on the radio channel based on UWB technology) only with the wireless devices (i.e. the nodes) that belong to the respective level l, with the nodes that belong to the level l−1 and with the nodes that belong to the level l+1. Therefore, while the level-1 nodes are in direct communication with the lander, the level-2 nodes and those of the subsequent levels cannot communicate directly with the lander and, in order to reach it, they must therefore use a routing protocol that relies on other network nodes.

A preferred solution to the problem of identification of the routing path from any one node toward the lander involves the use of the same incremental approach used for activation and initialization of the nodes of the hierarchical communication and localization network. The process is based on identification of at least one level l−1 reference node (where l indicates the level of the node for which communication with the lander is to be guaranteed) which operates as a gateway for communications with the lander.

For the level-1 nodes the reference node that acts as a gateway for communications with the lander is the lander itself. Moreover, the level-1 nodes can act as a gateway to the lander for the level-2 nodes. In the same way, the level-2 nodes can operate as a gateway to the lander for the level-3 nodes, and so forth.

In this regard, let us consider the scenario wherein the initialization procedure of the nodes of the hierarchical communication and localization network has reached level l−1. Each level l−1 node, therefore, is in direct or indirect communication with the lander. Each level l−1 node then repeats the activation procedure and sends an activation message in broadcast. The nodes in standby mode, i.e. that have not yet initialized, that correctly decode the activation message save the address of the sender in a vector as potential gateway to be selected for routing the communication to the lander. In fact the senders, belonging to level l−1, have already completed the initialization procedure, and therefore they must be in direct or indirect communication with the lander, i.e., even if they are not in direct communication with the lander, they know a way of routing information to the lander.

Recording of all the MAC addresses of level l−1 enables the nodes to select alternative routing paths both to tackle problems of communication with the gateway selected, and to distribute, in rotation and evenly, the cost, in terms of energy consumption, on the adjacent nodes.

Other routing methods can advantageously be implemented in the hierarchical communication and localization network both alternatively to the method described above, and as back-up methods. In particular, the most suitable routing method can advantageously be selected as a function of specific parameters of the mission in which the navigation system is used (for example as a function of the density of the nodes, of the duty-cycle, of the frequency with which the system must update the local reference system, etc.). For example, variants of known routing algorithms for wireless communication device networks can be considered.

In the same way, i.e. using the incremental approach both of deployment of the nodes (i.e. of the wireless devices) on the ground, and of activation thereof, the system can advantageously solve problems of access to the radio channel typical of a UWB multi-hop network by assigning transmission codes, or, more in general, the access parameters to the physical channel, according to the launch step of the wireless device and/or its initialization.

At the end of the initialization procedure of the hierarchical communication and localization network (the time required to terminate this procedure can depend on many factors, among which the number of wireless devices, the communication radius of the short-range radio interfaces based on UWB technology and the dimension of the area over which the wireless devices are spread) the state of the navigation system can be summarized as follows:

the wireless devices available are active and coordinates of the local reference system have been assigned to each of them;

the navigation system is structured, i.e. each node is assigned to a certain level and knows the method for sending information to the lander; moreover the structuring in levels enables each node and the navigation system, as a whole, to know the boundaries of the area of use (logical barriers); and, as a consequence of the method for determination of the mutual distances, the wireless devices are synchronized with one another (minimum accuracy in the order of milliseconds).

After initialization of the hierarchical communication and localization network, the following steps are carried out in order to make the navigation system operational:

the first radio channel (i.e. the radio communication channel based on UWB technology) is initialized and verified by means of data exchange and by carrying out some ranging measurement sessions with the lander; and the topology of the hierarchical communication and localization network (i.e. the coordinates of each wireless device in the local reference system) is transmitted, using both radio channels, from the lander to the rover that stores it.

It is not necessary for the rover to determine a gateway table of its own if it requires to use the hierarchical communication and localization network to communicate with the lander, as its point of access to this network can be any one of the wireless devices adjacent to the rover in the position in which it is located at the time. In fact, each wireless device, active and operating, constitutes a valid access point to the hierarchical communication and localization network. Therefore, the rover can communicate with the lander through the hierarchical communication and localization network using an adjacent wireless device as access point to this network.

In the operating step of the navigation system, the rover moves inside the operating area and periodically carries out ranging measurements with the wireless devices adjacent thereto. Using these measurements together with the information on the topology of the hierarchical communication and localization network transmitted by the lander, the rover calculates its position inside the operating area with respect to the local reference system.

It is important to note that the drive system of the rover must take into account the proximity information of the wireless devices to avoid colliding with them. In particular, a significant displacement of the position of the wireless devices could require calculation of a new local reference system. Therefore, the rover is advantageously configured to avoid colliding with the wireless devices (for example by stopping and/or recalculating the trajectory along which it is moving) on the basis of its position, of information on the topology of the hierarchical communication and localization network transmitted by the lander and of the ranging measurements carried out by said rover. In other words, the wireless devices are used intrinsically as radio beacons, i.e. to provide the rover with proximity information, in order to facilitate return of the rover to the operating area of the navigation system if said rover exits therefrom and in order to prevent collision between the rover and the wireless devices from making frequent updating of the reference coordinate system necessary.

During the operating step the lander periodically activates a verification procedure of the state of integrity of the navigation system, in particular of the hierarchical communication and localization network, in such a manner as to:
  check the state of the wireless devices (battery charge level, battery drain rate, significant variations in the quality of the signals received, and other relevant parameters); and
  detect any variations of the topology of the hierarchical communication and localization network, for example due to
    variations in the position of the wireless devices (detected through observing significant changes in the ranging measurements taken by adjacent nodes), for example due to wind, ground subsidence, accidental impact with the rover or other environmental phenomena, and/or
    deterioration in the accuracy of the position of the wireless devices (evaluated in statistical terms through periodic recalculation of the position of the wireless devices).

The information relating to the state of integrity of the navigation system, i.e. of the hierarchical communication and localization network, is transmitted from the lander to the rover which can modify its behaviour as a function of said state of integrity (for example it can reduce speed, it can wait for more stable conditions to perform activities that require high reliability of the position information, etc.) up to the limit case in which the lander communicates to the rover the need to re-initialize the hierarchical communication and localization network. Therefore, the rover is advantageously configured to modify its operating behaviour (for example by stopping) if the state of integrity of the navigation system does not satisfy predetermined conditions.

The navigation system is capable of providing positioning with accuracy below one meter and is configured also to implement monitoring and control functionalities. In particular, the impossibility of forecasting and counteracting any environmental variations (sand storms, tectonic activity, instability of the terrain) and any faults in the wireless devices (power supply anomalies due to contingent weather conditions, circuit errors, etc.) are compensated by modules for self-monitoring and determining the state of integrity of the navigation system, i.e. of the hierarchical communication and localization network. The integrity information is made available to the rovers so as to be used in combination with their "operating plans" (for example, some operating steps could require specific accuracy or reliability). Moreover, in the case of serious malfunctions, the central mission control system can even decide to stop the rovers until the nominal operating conditions of the navigation system are restored.

The navigation system provides this monitoring of the state of integrity through its primary functionality, i.e. through automatic calculation of the topology of the hierarchical communication and localization network and through determination of the local reference system.

The local reference system represents the most important high level requirement for each navigation system. For this reason, the first operating step established for the navigation system according to the preferred embodiment of the present invention is the determination of the local reference system and of the position of each wireless device in this local reference system. As previously described, the local reference system depends on the position of each wireless device and, therefore, cannot be assumed as static. The greatest strength of the integrity system of the navigation system is the use of its primary functionality not only for preliminary initialization, but also as continuous service for the supply of differential information concerning the accuracy and validity of the local reference system. This information is disseminated to the wireless devices and to the rovers in order to enable them to perform and implement specific actions dependent on their specific state.

This characteristic makes the navigation system according to the preferred embodiment of the present invention a system with great flexibility and configurability. Moreover, the autonomous mechanism for determining the topology of the hierarchical communication and localization network is low cost and represents a simple and direct manner of returning the whole system toward a steady state, thus enabling major fault recovery primarily re-using the operating functions.

The actual performances of the navigation system according to the preferred embodiment of the present invention can depend of various factors, including:
  the number of wireless devices;
  the dimensions of the operating area;
  the distance between wireless devices (in fact the accuracy of ranging measurements decreases with distance);
  the available transmission power of the wireless devices and the speed of the first radio channel, i.e. of the radio communication channel based on UWB technology; and
  the duration of the navigation system mission.

These factors are not independent from one another and their interactions must be considered during definition of the mission requirements. For example, the number of wireless devices depends on the dimension of the operating area and on the UWB communication radius between two wireless devices and, naturally, also on the loading capacity of the lander. In turn, the UWB communication distance between two wireless devices depends on the usable transmission power and on the duration established for the mission.

The ability of the navigation system to simultaneously transfer information and determine the position enables high flexibility in the definition of specialized instances of the system to cover a wide range of possible application scenarios. In any case, the functionalities and basic performances of the navigation system are guaranteed regardless of the specific specialization and adaptation to a specific mission.

The primary functionalities and characteristics and some indicative performances of the navigation system, both at system level and at the level of single wireless device, are indicated in the following.

In particular, the primary functionalities and characteristics at system level are:
  a single network (i.e. the hierarchical communication and localization network) both for navigation and for data transfer (for example for operations of monitoring and checking the integrity);

autonomous determination of the topology of the hierarchical communication and localization network (reference coordinate system);

dynamic monitoring of the topology of the hierarchical communication and localization network;

robustness in the case of modifications to the topology of the hierarchical communication and localization network during operations (for example in the case of a fault in one or more wireless devices, of accidental displacement of the nodes, etc.);

implicit synchronization of the hierarchical communication and localization network and the possibility of explicit synchronization for specific applications (for example, through the use of optimized algorithms and through the use of estimation of synchronization errors for evaluation of the integrity); and determination of the state of integrity of the system (the time for calculation of the integrity depends on parameters such as the dimension of the operating area, the density of wireless devices, the speed of the first radio channel, i.e. of the radio communication channel based on UWB technology).

Moreover, the navigation system can advantageously be configured to perform a weighted calculation of the levels of integrity as a function of the mission priorities.

Instead, with regard to the performances at system level, the accuracy of the positioning in the plane is a function of the accuracy in determining the coordinates of the wireless devices, of the accuracy of the ranging measurements taken by the rovers, of the distance of the rover from the lander (the measurement errors propagate as the level of the wireless devices increases) and of the geometrical distribution of the wireless devices adjacent to the rover (Dilution Of Precision—DOP). In an example scenario with 5 levels of distance from the lander, an accuracy on the ranging measurements of 10 cm and a geometric DOP (Geometric Dilution Of Precision—GDOP), i.e. the dilution of precision due to the geometric configuration of the nodes, constant less than 4.5, it is possible to obtain positioning accuracies of less than one meter (1-sigma). The height positioning accuracy depends on the characteristics of the operating context and on the availability of additional information.

Moreover, the primary functionalities and characteristics at the level of single wireless device are:

the ability to monitor the operating parameters of each wireless device (residual battery charge, number of transmissions per second, consumption rate of the batteries, adjacency matrix of other wireless devices, etc.);

modularity; in fact the wireless devices can advantageously be equipped with various types of sensors to create multi-functional nodes (for example for collecting environmental parameters); and the characteristics of the UWB signal that make the wireless devices particularly suitable to operate in environments with unfavourable environmental conditions (for example due to the presence of obstacles, of an electromagnetic background with interference, etc.).

Moreover, with regard to performances at the level of single wireless device, the accuracy of the ranging measurements depends on the number of measurements taken, on the distance of the wireless devices, on the bandwidth of the first radio channel, on the electromagnetic background conditions, i.e. on the signal-to-noise ratio (SNR), and on the line of sight (LOS) conditions. In an example scenario with two wireless devices positioned at a distance of 30 meters, an average among 10 ranging measurements, the use, in open field and in LOS conditions, of a Time-Hopping Impulse-Radio Ultra-WideBand (TH-IR-UWB) system with SNR of 0 dB and band of 1.5 GHz, it is possible to obtain a ranging measurement accuracy of less than 10 cm (1-sigma).

Therefore, to summarize some of the advantages of the navigation system, with the hierarchical communication and localization network based on UWB technology it is possible to:

obtain an indication on the propagation of positioning errors;

implement energy saving strategies in the routing of information to be transferred to the lander and/or to the rovers; and communicate in environments with considerable electromagnetic disturbance and, simultaneously, carry out very accurate ranging measurements.

It can be immediately understood from the foregoing description how the present invention can advantageously be used to make:

a localization system based on the hierarchical communication and localization network described previously;

a navigation system for any type of vehicle, unmanned or remotely-controlled, that is configured to move on surfaces and/or underwater;

an exploration system based on the navigation system described previously; and a monitoring system based on the navigation system described previously in which the lander and/or one or more rovers and/or one or more wireless devices are advantageously equipped with one or more sensors configured to acquire, i.e. to sense, parameters from/of the surrounding environment, i.e. data and/or information on the surrounding environment, for example the outside temperature, the atmospheric pressure, etc.

Moreover, from the previous description it can also be understood how the present invention can advantageously be used to make localization and/or navigation in, and/or exploration and/or monitoring of, any unknown and/or difficult (i.e. inaccessible) environment, such as:

a celestial object (or body), for example, a planet, a natural satellite, or an asteroid;

an area affected by a disaster, for example an area affected by an earthquake and/or a tsunami and/or a flooding and/or involved by a volcanic eruption and/or a landslide;

an underwater environment; etc.

Finally, it is understood that various modifications may be made to the present invention, all falling within the scope of protection of the invention, as defined in the appended claims.

The invention claimed is:

1. A navigation system for exploring or monitoring unknown or difficult environments, comprising:

a mission control module designed to be placed in an unknown or difficult environment and to control an exploration or monitoring mission in said unknown or difficult environment, wherein said mission control module comprises a respective predefined radio communication interface and is configured to send mission data concerning said exploration or monitoring mission and navigation data concerning a local reference coordinate system and an overall integrity state of a hierarchical communication and localization network to a vehicle control unit using the respective predefined radio communication interface;

an unmanned vehicle operable to carry out said exploration or monitoring mission in said unknown or difficult environment, wherein said unmanned vehicle comprises said vehicle control unit that includes a respective predefined radio communication interface and a respective ultra-wideband radio interface and that is configured to receive data from said mission control module said using the respective predefined radio communication interface, wherein said vehicle control unit is further configured to:
  using said respective ultra-wideband radio interface, make distance measurements with respect to, and together with, one or more nodes of said hierarchical communication and localization network;
  compute a position of said unmanned vehicle in said local reference coordinate system on the basis of said navigation data received from said mission control module and of said distance measurements made by said vehicle control unit; and
  pilot said unmanned vehicle in said unknown or difficult environment on the basis of said mission data and of said navigation data received from said mission control module, said distance measurements made by said vehicle control unit and positions of said unmanned vehicle in said local reference coordinate system;
a primary node coupled to said mission control module and comprising a respective ultra-wideband radio interface; and
a plurality of secondary nodes designed to be deployed in said unknown or difficult environment; wherein each secondary node from said plurality of secondary nodes including a respective ultra-wideband radio interface;
wherein said primary node and said plurality of secondary nodes are configured to form a hierarchical communication and localization network in which said primary node is associated with a primary hierarchical level and said each secondary node is associated with a respective secondary hierarchical level lower than said primary hierarchical level;
wherein each said primary node and said each secondary node are configured to send and receive messages through said hierarchical communication and localization network using said respective ultra-wideband radio interface;
wherein said each secondary node is configured to:
using said respective ultra-wideband radio interface, make distance measurements with respect to, and together with, other secondary nodes associated with said respective secondary hierarchical level, with which said each secondary node is associated, and with respect to, and together with, other nodes, associated with hierarchical levels adjacent to said secondary hierarchical level with which said each secondary node is associated, and
send to said primary node distance-related messages concerning said distance measurements carried out by said each secondary node and integrity-related messages indicating a respective state of operational integrity of said each secondary node; and
said primary node is configured to:
  using said respective ultra-wideband radio interface, make distance measurements with respect to, and together with, said plurality of secondary nodes associated with a secondary hierarchical level immediately lower than said primary hierarchical level,
  compute, on the basis of said distance measurements made by said primary node and said distance-related messages received from said plurality of secondary nodes, a local reference coordinate system indicative of said positions of said plurality of secondary nodes with respect to said primary node, and
  determine an overall integrity state of said hierarchical communication and localization network on the basis of said integrity-related messages received from said plurality of secondary nodes, said distance measurements made by said primary node and said distance-related messages received from said plurality of secondary nodes, said overall integrity state of said hierarchical communication and localization network being indicative of one or more states of operational integrity of said plurality of secondary nodes and of levels of reliability and accuracy of said positions of said plurality of secondary nodes in said local reference coordinate system.

2. The navigation system of claim 1, wherein:
said each secondary node is configured to:
  using said respective ultra-wideband radio interface, make initial distance measurements with respect to, and together with, other secondary nodes associated with said respective secondary hierarchical level with which said each secondary node is associated, and with respect to, and together with, other nodes associated with said hierarchical levels adjacent to said secondary hierarchical level with which said each secondary node is associated;
  using the respective ultra-wideband radio interface, periodically make current distance measurements with respect to, and together with, other secondary nodes associated with said respective secondary hierarchical level with which said each secondary node is associated, and with respect to, and together with, other nodes associated with said hierarchical levels adjacent to said secondary hierarchical level with which said each secondary node is associated; and
  send to said primary node initial distance-related messages concerning said initial distance measurements made by said each secondary node and said current distance-related messages concerning said current distance measurements periodically made by said each secondary node; and
wherein said primary node is configured to:
  using said respective ultra-wideband radio interface, make initial distance measurements with respect to, and together with, said plurality of secondary nodes associated with said secondary hierarchical level immediately lower than said primary hierarchical level;
  using said respective ultra-wideband radio interface, periodically make current distance measurements with respect to, and together with, said plurality of secondary nodes associated with said secondary hierarchical level immediately lower than said primary hierarchical level;
  compute said local reference coordinate system on the basis of said initial distance measurements made by said primary node and of said initial distance-related messages received from said plurality of secondary nodes; and
  update said local reference coordinate system on the basis of said current distance measurements periodically made by said primary node and of said current distance-related messages received from said plurality of secondary nodes.

3. The navigation system of claim 2, wherein:
said each secondary node is configured to:
  determine a respective initial state of operational integrity;

periodically determine a respective current state of operational integrity; and send to said primary node an initial integrity-related message indicating said respective initial state of operational integrity and a current integrity-related messages indicating said respective current state of operational integrity; and wherein said primary node is configured to:

determine said overall integrity state of t said hierarchical communication and localization network on the basis of said initial integrity-related messages received from said plurality of secondary nodes, of said initial distance measurements made by said primary node and of said initial distance-related messages received from said plurality of secondary nodes; and update said overall integrity state of said hierarchical communication and localization network on the basis of said current integrity-related messages received from said plurality of secondary nodes, of said current distance measurements periodically carried out by said primary node and of said current distance-related messages received from said plurality of secondary nodes.

4. The navigation system according to claim 1, wherein:
said primary node is configured to:
using said respective ultra-wideband radio interface, make preliminary distance measurements with respect to, and together with, first specific secondary nodes that are candidates to be associated with a secondary hierarchical level immediately lower than said primary hierarchical level; and
associate one or more of said first specific secondary nodes with said secondary hierarchical level immediately lower than said primary hierarchical level on the basis of said preliminary distance measurements made by said primary node;
wherein each of given secondary nodes associated with a first given secondary hierarchical level is configured to:
using said respective ultra-wideband radio interface, make preliminary distance measurements with respect to, and together with, second specific secondary nodes which are candidates to be associated with a second given secondary hierarchical level immediately lower than said first given secondary hierarchical level; and
send to said primary node preliminary distance-related messages concerning said preliminary distance measurements carried out by said given secondary nodes; and
wherein said primary node is further configured to associate one or more of said second specific secondary nodes with said second given secondary hierarchical level on the basis of said preliminary distance-related messages received from said given secondary nodes.

5. The navigation system of claim 4, wherein said primary node is configured to transmit, through said respective ultra-wideband radio interface, notification messages each of which is addressed to one or more specific secondary nodes and indicates a secondary hierarchical level with which said one or more specific secondary nodes have been associated by said primary node; and
wherein said each secondary node is configured to:
if it receives through said respective ultra-wideband radio interface a notification message addressed to said each secondary node, assume as respective secondary hierarchical level said secondary hierarchical level indicated in said notification message received; and,
if it receives through said respective ultra-wideband radio interface a notification message that is addressed to one or more other secondary nodes and that indicates a secondary hierarchical level lower than said secondary hierarchical level with which said each secondary node is associated, retransmit through said respective ultra-wideband radio interface said notification message received by routing it to said one or more specific secondary nodes associated with a hierarchical level lower than the secondary hierarchical level with which said each secondary node is associated.

6. The navigation system according to claim 1, wherein said each secondary node is configured to:
send to said primary node said integrity-related messages indicating said respective state of operational integrity and said distance-related messages concerning said distance measurements made by said each secondary node by transmitting said messages through said respective ultra-wideband radio interface; and,
if it receives through said respective ultra-wideband radio interface a distance-related message or an integrity-related message transmitted by another secondary node associated with a secondary hierarchical level lower than said secondary hierarchical level with which said each secondary node is associated, retransmit through said respective ultra-wideband radio interface said distance-related message received or said integrity-related message received by routing it to one or more nodes associated with a hierarchical level higher than said secondary hierarchical level with which said each secondary node is associated.

7. The navigation system according to claim 1, wherein said vehicle control unit is configured to send to said mission control module first localization data concerning said distance measurements made by said vehicle control unit by using said respective predefined radio communication interface;
wherein said mission control module is configured to:
compute a position of said unmanned vehicle in said local reference coordinate system on the basis of said first localization data received from said vehicle control unit; and
send second localization data regarding said positions of said unmanned vehicle in said local reference coordinate system to said vehicle control unit by using said respective predefined radio communication interface; and
wherein said vehicle control unit is configured to pilot said unmanned vehicle in said unknown or difficult environment also on the basis of said second localization data received from said mission control module.

8. The navigation system of claim 7, wherein said vehicle control unit is configured to send said first localization data to said mission control module also through said hierarchical communication and localization network by using said respective ultra-wideband radio interface; and wherein said mission control module is configured to receive said first localization data from said vehicle control unit and send said second localization data to said vehicle control unit also through said hierarchical communication and localization network by using said primary node.

9. The navigation system according to claim 1, wherein said mission control module is configured to send said mission data and said navigation data to said vehicle control unit also over said hierarchical communication and localization network by using said primary node; and wherein said vehicle control unit is configured to receive said mission data and said navigation data from said mission control module also over said hierarchical communication and localization network by using said respective ultra-wideband radio interface.

10. The navigation system according to claim 1, wherein said vehicle control unit is configured to:
- stop said unmanned vehicle if said overall integrity state of said hierarchical communication and localization network does not satisfy predetermined conditions; and
- prevent said unmanned vehicle from colliding with any nodes of said hierarchical communication and localization network on the basis of said positions of said unmanned vehicle in said local reference coordinate system, of said navigation data received from said mission control module and of said distance measurements made by said vehicle control unit.

11. The navigation system according to claim 1, wherein at least one secondary node comprises one or more sensors designed to acquire data concerning said unknown or difficult environment, and is configured to send said acquired data to said primary node.

12. The navigation system according to claim 1, wherein said unmanned vehicle comprises one or more sensors designed to acquire data concerning said unknown or difficult environment, and wherein said vehicle control unit is configured to send data acquired by said one or more sensors to said mission control module using said respective predefined radio communication interface.

13. The system of claim 12, wherein said vehicle control unit is configured to send said data acquired by said one or more sensors to said mission control module also over said hierarchical communication and localization network using said respective ultra-wideband radio interface.

* * * * *